(12) United States Patent
Roy et al.

(10) Patent No.: US 11,852,766 B2
(45) Date of Patent: Dec. 26, 2023

(54) METHOD AND APPARATUS FOR IMPLEMENTING A SIGNATURE FINDER

(71) Applicant: BP Corporation North America Inc., Houston, TX (US)

(72) Inventors: Atish Roy, Houston, TX (US); Eric Kazlauskas, Cypress, TX (US); Anar Yusifov, Houston, TX (US)

(73) Assignee: BP Corporation North America, Inc., Houston, TX (US)

( * ) Notice: Subject to any disclaimer, the term of this patent is extended or adjusted under 35 U.S.C. 154(b) by 171 days.

(21) Appl. No.: 17/448,519

(22) Filed: Sep. 22, 2021

(65) Prior Publication Data

US 2022/0099852 A1    Mar. 31, 2022

Related U.S. Application Data

(60) Provisional application No. 63/085,412, filed on Sep. 30, 2020.

(51) Int. Cl.
*G01V 1/30* (2006.01)
*G06F 18/23* (2023.01)
(Continued)

(52) U.S. Cl.
CPC .............. *G01V 1/30* (2013.01); *G06F 18/211* (2023.01); *G06F 18/23* (2023.01); *G06N 7/01* (2023.01); *G01V 2210/61* (2013.01)

(58) Field of Classification Search
CPC ...... G01V 1/30; G01V 2210/61; G01V 1/345; G01V 2210/63; G01V 2210/64;
(Continued)

(56) References Cited

U.S. PATENT DOCUMENTS

2018/0003839 A1    1/2018 Lowell et al.

FOREIGN PATENT DOCUMENTS

EP          796441 B1 * 12/2001 ............. G01V 1/284

OTHER PUBLICATIONS

PCT/US2021/071558 International Search Report and Written Opinion dated Jan. 4, 2022 (17 p.).
(Continued)

*Primary Examiner* — Roy Y Yi
*Assistant Examiner* — Geoffrey T Evans
(74) *Attorney, Agent, or Firm* — Conley Rose, P.C.

(57) ABSTRACT

Techniques to match a signature in seismic data with a seismic attribute space. A method includes automatically selecting a first plurality of seismic attributes corresponding to seismic data as first selected seismic attributes, combining the first selected seismic attributes into a first realization of attributes, performing a first cluster analysis on the first realization of attributes to generate a first clustered volume, selecting a region of interest (ROI) in the seismic data, projecting the ROI onto the first clustered volume to generate a first signature, determining a first level of correlation between the ROI and the first signature, and determining whether the first level of correlation between the ROI and the first signature exceeds a predetermined threshold and outputting a first correlation volume corresponding to the first signature when the first level of correlation between the ROI and the first signature exceeds the predetermined threshold.

21 Claims, 15 Drawing Sheets

(51) Int. Cl.
*G06F 18/211* (2023.01)
*G06N 7/01* (2023.01)

(58) Field of Classification Search
CPC ....... G01V 1/301; G06F 18/211; G06F 18/23; G06N 7/01
See application file for complete search history.

(56) References Cited

OTHER PUBLICATIONS

Galvis, Ivan Sanchez et al., "Seismic Attribute Selection and Clustering to Detect and Classify Surface Waves in Multicomponent Seismic Data by Using k-Means Algorithm," The Leading Edge, vol. 36, No. 3, Mar. 1, 2017, pp. 239-248 ((10 p.).
Roden, Rocky et al., "Geologic Pattern Recornition from Seismic Attributes: Principal Component Analysis and Self-Organizing Maps," Interpretation, vol. 3, No. 4, Nov. 1, 2015, pp. SAE59-SAE83 ((26 p.).

* cited by examiner

METHOD AND APPARATUS FOR IMPLEMENTING A SIGNATURE FINDER

CROSS REFERENCE TO RELATED APPLICATIONS

This application claims the benefit of U.S. Provisional Patent Application Ser. No. 63/085,412 filed Sep. 30, 2020, and entitled "Method and Apparatus for Implementing a Signature Finder," which is hereby incorporated herein by reference in its entirety for all purposes.

BACKGROUND

The present disclosure relates generally to implementing a signature finder.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
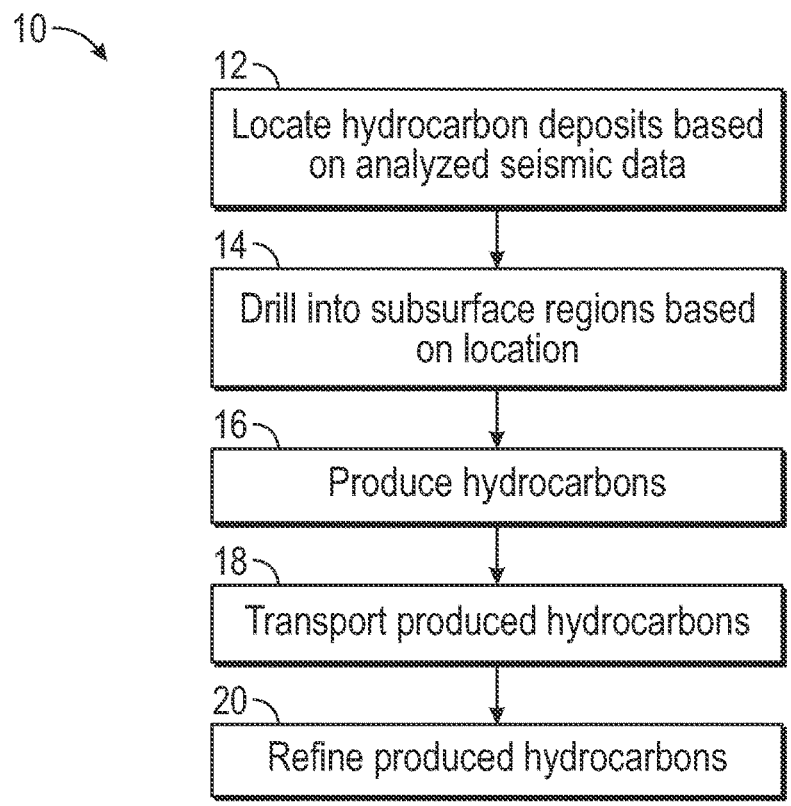
FIG. 1 illustrates a flow chart of various processes that may be performed based on analysis of seismic data acquired via a seismic survey system.
Figure 2:
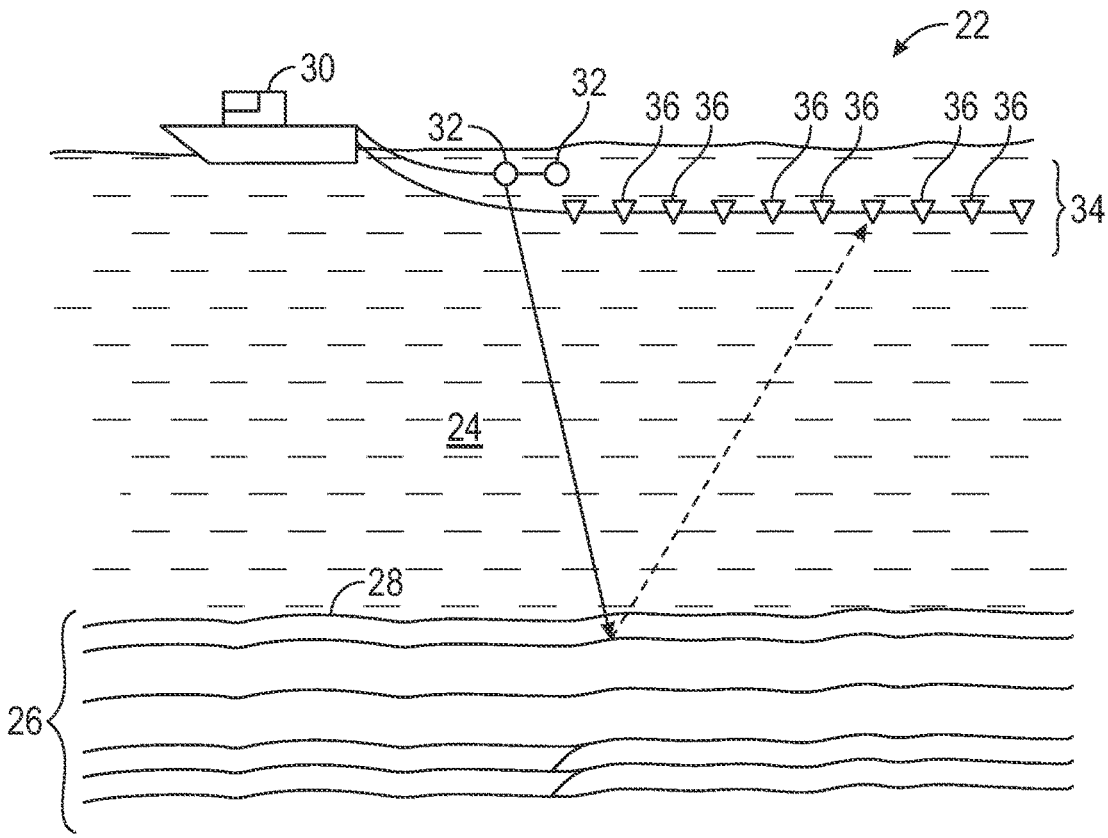
FIG. 2 illustrates a marine survey system in a marine environment.
Figure 3:
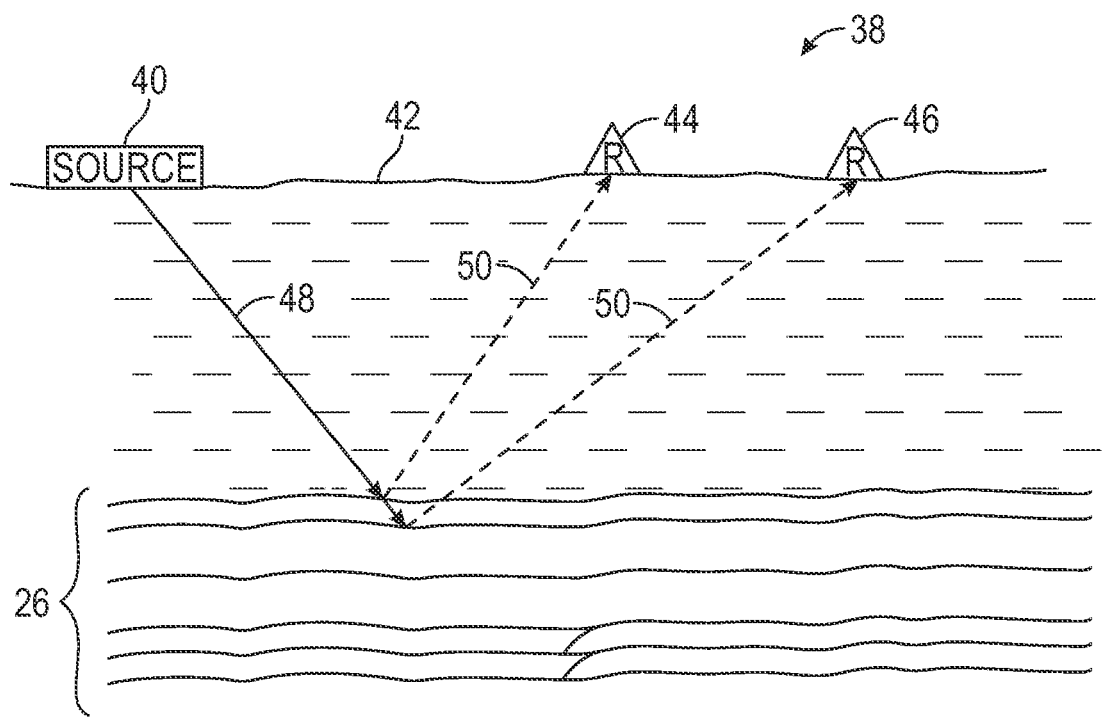
FIG. 3 illustrates a land survey system in a land environment.

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired may be analyzed to generate a map or profile that illustrates various geological formations within the subsurface region. Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

With the foregoing in mind, FIG. 2 is a schematic diagram of a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, one or more seismic sources 32, a (seismic) streamer 34, one or more (seismic) receivers 36, and/or other equipment that may assist in acquiring seismic images representative of geological formations within a subsurface region 26 of the Earth. The vessel 30 may tow the seismic source(s) 32 (e.g., an air gun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic source(s) 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an air gun array) and one receiver 36 (represented in FIG. 2 as a set of hydrophones), it should be noted that the marine survey system 22 may include multiple seismic sources 32 and multiple receivers 36. In the same manner, although the above descriptions of the marine survey system 22 is described with one seismic streamer 34, it should be noted that the marine survey system 22 may include multiple streamers similar to streamer 34. In addition, additional vessels 30 may include additional seismic source(s) 32, streamer(s) 34, and the like to perform the operations of the marine survey system 22.

FIG. 3 is a block diagram of a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 and land-based receiver 44. In some embodiments, the land survey system 38 may include multiple land-based seismic sources 40 and one or more land-based receivers 44 and 46. Indeed, for discussion purposes, the land survey system 38 includes a land-based seismic source 40 and two land-based receivers 44 and 46. The land-based seismic source 40 (e.g., seismic vibrator) that may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
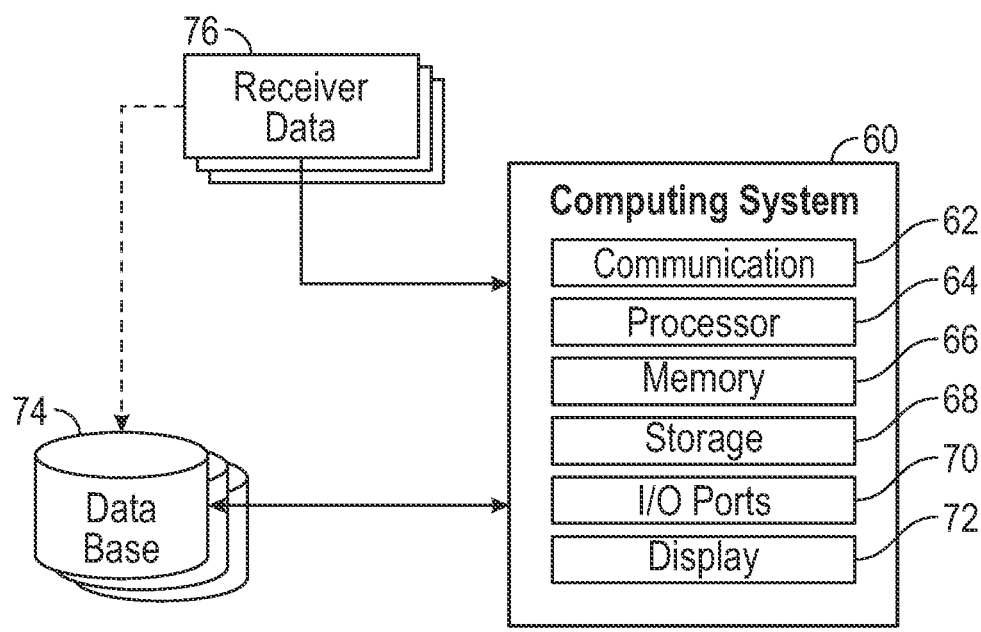
FIG. 4 illustrates a computing system that may perform operations described herein based on data acquired via the marine survey system of FIG. 2 and/or the land survey system of FIG. 3.

Regardless of how the seismic data is acquired, a computing system (e.g., for use in conjunction with block 12 of FIG. 1) may analyze the seismic waveforms acquired by the receivers 36, 44, 46 to determine seismic information regarding the geological structure, the location and property of hydrocarbon deposits, and the like within the subsurface region 26. FIG. 4 is a block diagram of an example of such a computing system 60 that may perform various data analysis operations to analyze the seismic data acquired by the receivers 36, 44, 46 to determine the structure and/or predict seismic properties of the geological formations within the subsurface region 26.

Referring now to FIG. 4, the computing system 60 may include a communication component 62, a processor 64, memory 66, storage 68, input/output (I/O) ports 70, and a display 72. In some embodiments, the computing system 60 may omit one or more of the display 72, the communication component 62, and/or the input/output (I/O) ports 70.

The communication component 62 may be a wireless or wired communication component that may facilitate communication between the receivers 36, 44, 46, one or more databases 74, other computing devices, and/or other communication capable devices. In one embodiment, the computing system 60 may receive receiver data 76 (e.g., seismic data, seismograms, etc.) via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

With one or more embodiments, processor 64 can instantiate or operate in conjunction with one or more classifiers. With one or more embodiments, the classifiers can be linear classifiers (such as, for example, Multi-Layer Perception classifiers), support vector classifiers, and/or quadratic classifiers, for example. With another embodiment, the classifier can be implemented by using neural networks. The one or more neural networks can be software-implemented or hardware-implemented. One or more of the neural networks can be a convolutional neural network.

With one or more embodiments, these classifiers can provide responses to different inputs. The process by which a classifier learns and responds to different inputs may be generally referred to as a "training" process.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, predictions of seismic properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems 60. In this case, each computing system 60 operating as part of a super computer may not include each component listed as part of the computing system 60. For example, each computing system 60 may not include the display 72 since multiple displays 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the seismic sources 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

In one embodiment, the computing system 60 analyzes the acquired seismic data utilizing a signature finder operation (e.g., a program or code stored, for example, in the storage 68 and/or the memory 66 and executed by the processor 64) that is based on a machine learning workflow is implemented to help recognize user-defined patterns in the seismic data. These user-defined patterns can be prospects like hydrocarbon sand, brine sand, any geologic features or seismic noise.

One technique for this is to manually look into different seismic attribute volumes and try to find prospects or de-risk prospects. However manual interpretation many times has user biased and interpretations would differ from experienced vs. non experienced geoscientists. Sometimes, in unknown areas (e.g., exploration prospects or where there is little knowledge of the reservoir), such user/interpreter for data selection bias can lead to wrong interpretations. Also, the manual process is cumbersome and takes time. A signature finder operation is an efficient way to include an increased number of seismic information for analysis and removes user bias in identifying patterns in the seismic data, thus de-risking prospects while increasing the accuracy of the interpretations.

With one or more embodiments, as a signature finder operation was being developed, case studies were run to find the presence of prospective sands in several surveys from North Sea, Mauritanian Senegal, Trinidad and Egypt. Each of the case studies was successful in determining prospective sands based on selected patterns/targets, considering the limitations from the seismic data.

Figure 5:
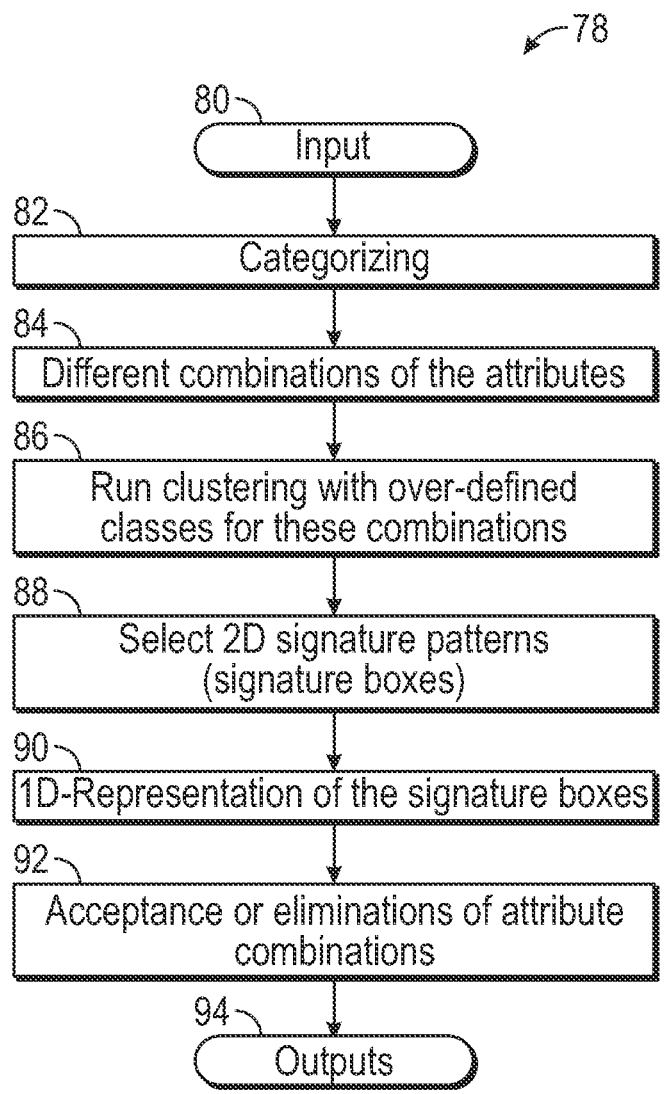
FIG. 5 illustrates a flow diagram of a signature finder operation, in accordance with an embodiment.

With one or more embodiments, a signature finder operation is based on an unsupervised clustering-based technique followed by image match technique. FIG. 5 illustrates one example of the signature finder operation as a flow chart 78, which may illustrate the signature finder operation as a program performed on the computing system 60 to analyze acquired seismic data (e.g., performed as code stored on a tangible and non-transitory machine readable medium, such as the memory 66 and/or the storage 68, that when in operation causes the processor 64 to perform one or more of the steps of the flow chart 78 as performance of the signature finder operation). Generally, flow chart 78 includes step 80 as accessing and/or receiving input seismic data, step 82 as categorizing attributes of that data, step 84 as generating different combinations of the attributes, step 86 as performing run clustering for the combinations, step 88 as selecting signature boxes, step 90 as representing the signature boxes, step 92 as acceptance or elimination of attribute combinations, and step 94 as generation of output(s).

As illustrated, step 80 includes accessing or receiving input seismic data. This input seismic data can be, for example, a set (e.g., 10, 15, 20, 25, 30, or more) of amplitude volumes that may each have one or more seismic attributes, for example, it can include a full stack, a partial stack, a mid stack, a far stack (of processed seismic records), it may include spectral decomposition volumes, it may include structural attributes, and/or other seismic data. The data of step 80 thus may represent processed seismic data as in input to the signature finder operation.

In step 82, the input data from step 80 are categorized. This categorization of the input data may include subgroups for each item of seismic data (e.g., each seismic attribute dataset from step 80). In one embodiment, the subgroups include seismic amplitude data (e.g., full stack, near angle, mid angle, far angle, ultra far, blued seismic, etc. as attributes), intercept and gradient (e.g., acoustic impedance, gradient impedance, etc. as attributes), seismic attributes (e.g., envelope, quadrature, etc. as attributes), inverted seismic attributes as attributes, and/or other subgroups having attributes associated therewith. In some embodiments, the above categorized attributes can, accordingly, include seismic full stacks, seismic angle stacks, inverted stacks, rock physics volumes, spectral decomposed data, volumetric seismic attributes, etc. each organized into their respective subgroups. In addition to this, pre-stack seismic gathers can also be added to the set of input data.

In step 84, the processor 64 (or the processor executing code to affect the signature finder operation) operates to select one or more attributes categorized in step 82 to generate a realization of attributes. It should be noted that in some embodiments, this selection may be randomized so that the attributes selected from each group are chosen at random. In one embodiment, a single attribute from each group is selected to generate the realization of attributes. In another embodiment, one or more attributes are selected from each group to generate the realization of attributes. In a further embodiment, one or one or more attributes are selected from each group or less than the total number of groups to generate the realization of attributes. This selection process can be performed a number of times, for example, approximately 50 times, 75 times, 100 times, a number of times more than 100 times, or another number of times to generate corresponding realization of attributes. Indeed, in some embodiments, all possible combinations of attributes allowed by the selection constraints (i.e., how many groups can be selected from and how many allowed attributes from each group can be selected) may be generated in step 84. Likewise, a predetermined number of realization of attributes can be generated in step 84.

Thus, the selection and generation of a plurality of realization of attributes is performed in step 84, creating a plurality of different combinations of the input attributes. In some embodiments, a quality control step may be performed during step 84 in which the quality of the contributing attributes for a given realization of attributes are each checked against a given threshold for the respective contributing attribute and if one or more of the contributing attributes does not meet a required quality measure (e.g., threshold value or other reliability measure), the generated realization of attributes may be discarded or, for example, provided a lowered weighting value. The plurality of different combinations (as represented by the distinct realization of attributes) will be carried forward in the process for unsupervised cluster analysis and signature correlation step. As will be subsequently described, there will be options to accept or element various combinations. Accordingly, step 84 represents an automatic process that operates to improve the results of the signature finder operation by removing user bias from the selection of seismic attributes (i.e., a user does not determine specific attributes to form the realization of attributes and, thus, does not impart user bias into its formation).

In step 86, cluster analysis is performed on the plurality of generated combinations (realization of attributes) from step 84 as multi-attribute seismic facies classification. In some embodiments, the cluster analysis is an unsupervised cluster analysis, for example, a robust unsupervised cluster analysis, that is performed on each of the different combinations of the attribute dataset (realization of attributes). In one embodiment, the robust unsupervised cluster analysis is a Gaussian Mixture Model (GMM) Classification. In another embodiment, other unsupervised clustering algorithms, such as Self-organizing Maps (SoM) can also be used instead of GMM. Regardless, the cluster analysis is performed and operates to generate a plurality of unsupervised seismic facies volumes. An example of a seismic facies volume 96 that is generated is illustrated in FIG. 6 and a second example of a seismic facies volume 98 that is generated is illustrated in FIG. 7.

Figure 6:
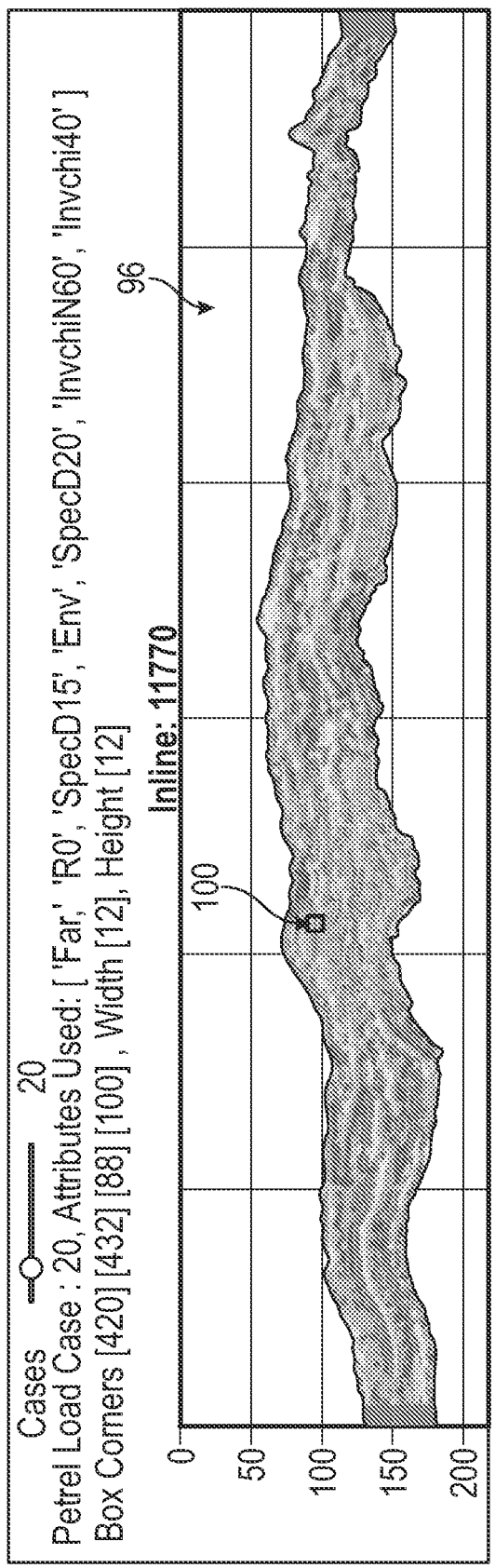
FIG. 6 illustrates a first example of a seismic facies volume generated in conjunction with the signature finder operation of FIG. 5, in accordance with an embodiment.
Figure 7:
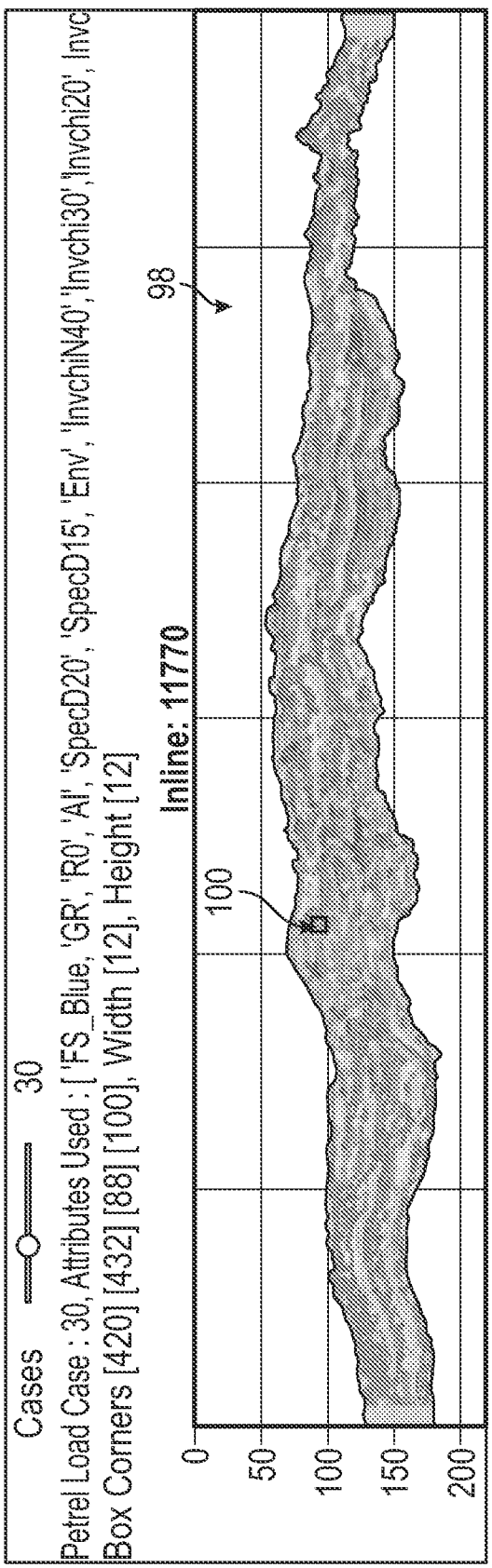
FIG. 7 illustrates a second example of a seismic facies volume generated in conjunction with the signature finder operation of FIG. 5, in accordance with an embodiment.

While two examples of seismic facies volumes 96 and 98 are illustrated respectively in FIG. 6 and FIG. 7, during step 86, more than two seismic facies volumes are typically generated in step 86 of FIG. 5. For each of the 100s' of generated combinations (realization of attributes) from step 84 an unsupervised seismic facies volume will be created. In some embodiments, the number of clusters or seismic facies are specified as predetermined value(s) and in some embodiments, the number of clusters are over defined.

Thus step 86 operates to run unsupervised clustering over a plurality (for example, 100) different attribute combination scenarios using automatically selected and compiled attributes. This additionally operates to generate a greater number and variety of seismic facies relative to user selected seismic attribute volumes that are then clustered, which leads to a greater dataset that can be used in conjunction with step 88 of the signature finder operation.

In step 88, a region of interest 2D (2-dimensional) signature patch (or a plurality of patches) are identified, for example, in a seismic volume of interest (i.e., the seismic data to be interpreted and from which a pattern to be matched is recognized as the ROI). This may be performed automatically by the computing system 60 (e.g., by the processor 64 or the processor executing code). In some embodiments the automated selection process by the computing system 60 can be based on, for example, drilled wells present in the region. Alternatively, a user may provide one or more inputs to the computing system 60 to select the signature patch/patches. These defined patterns as the ROI, i.e., signatures, can be prospects like hydrocarbon sand, brine sand, any geologic features or seismic noise. With one or more embodiments, an interpreter provides small signatures of the prospects or the region of interest. The signatures are identified in the input seismic data/attribute data. In some embodiments, there is no size limitation of the signatures, however, a focused signature may be preferred.

After one (or more than one) signature is identified, the identified signature(s) are projected on each of the unsupervised clustered volumes, which have been generated in step 86 as discussed above. FIG. 6 illustrates an example of a portion 100 of the facies volume 96 onto which the identified signature is projected (i.e., to determine correspondence between the two) and FIG. 7 also illustrates a portion 100 of the facies volume 98 onto which the identified signature is projected (i.e., to determine correspondence between the two). This projection represents a set of data points and in some embodiments, the process can be repeated for each of the facies volume 96 and the facies volume 98 with respect to additional portions of the facies volume 96 and the facies volume 98.

Figure 8:
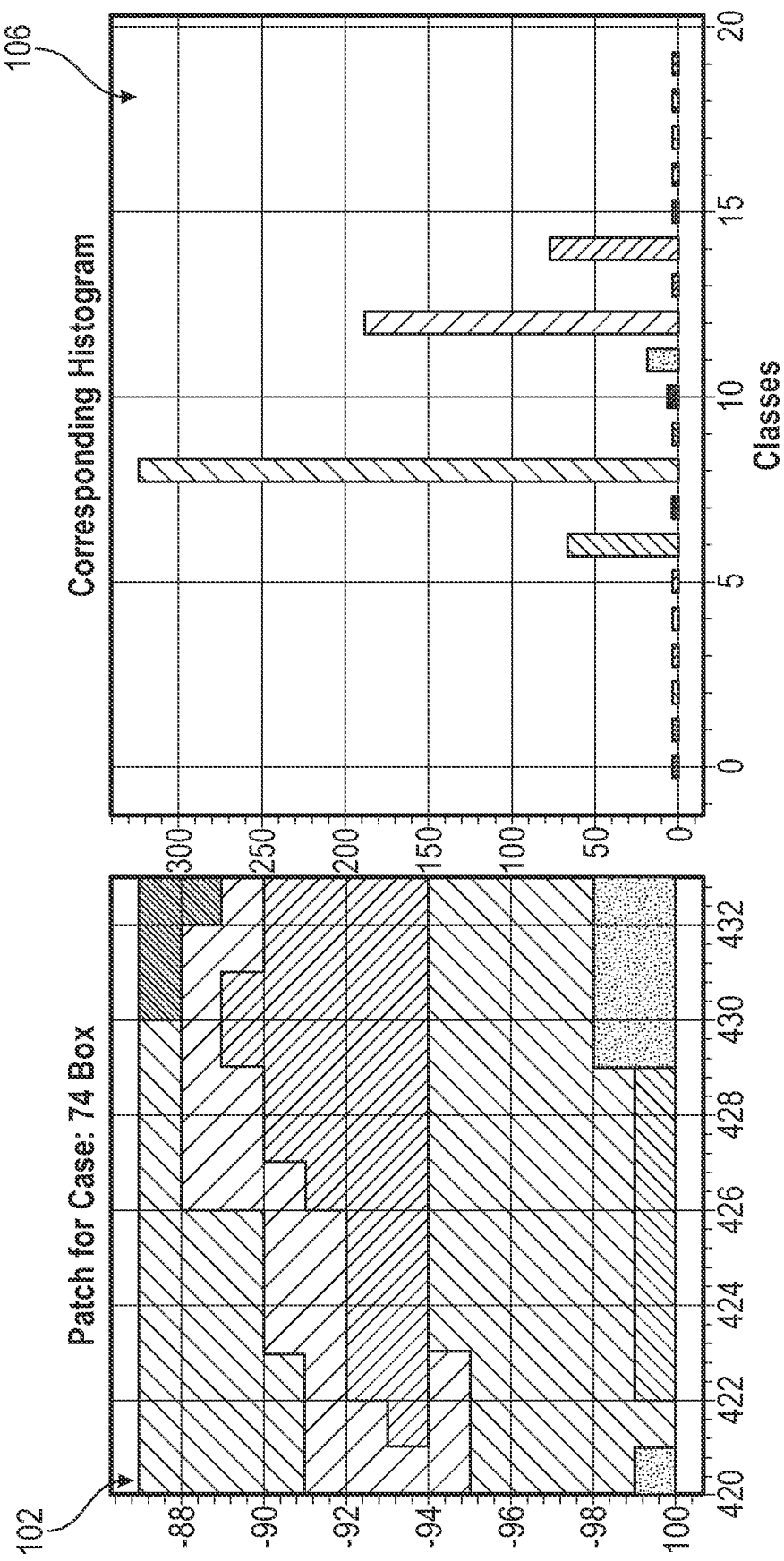
FIG. 8 illustrates a first example of a 2-Dimension (2D) patch and its corresponding 1-Dimension (1D) histogram generated in conjunction with the signature finder operation of FIG. 5, in accordance with an embodiment.
Figure 9:
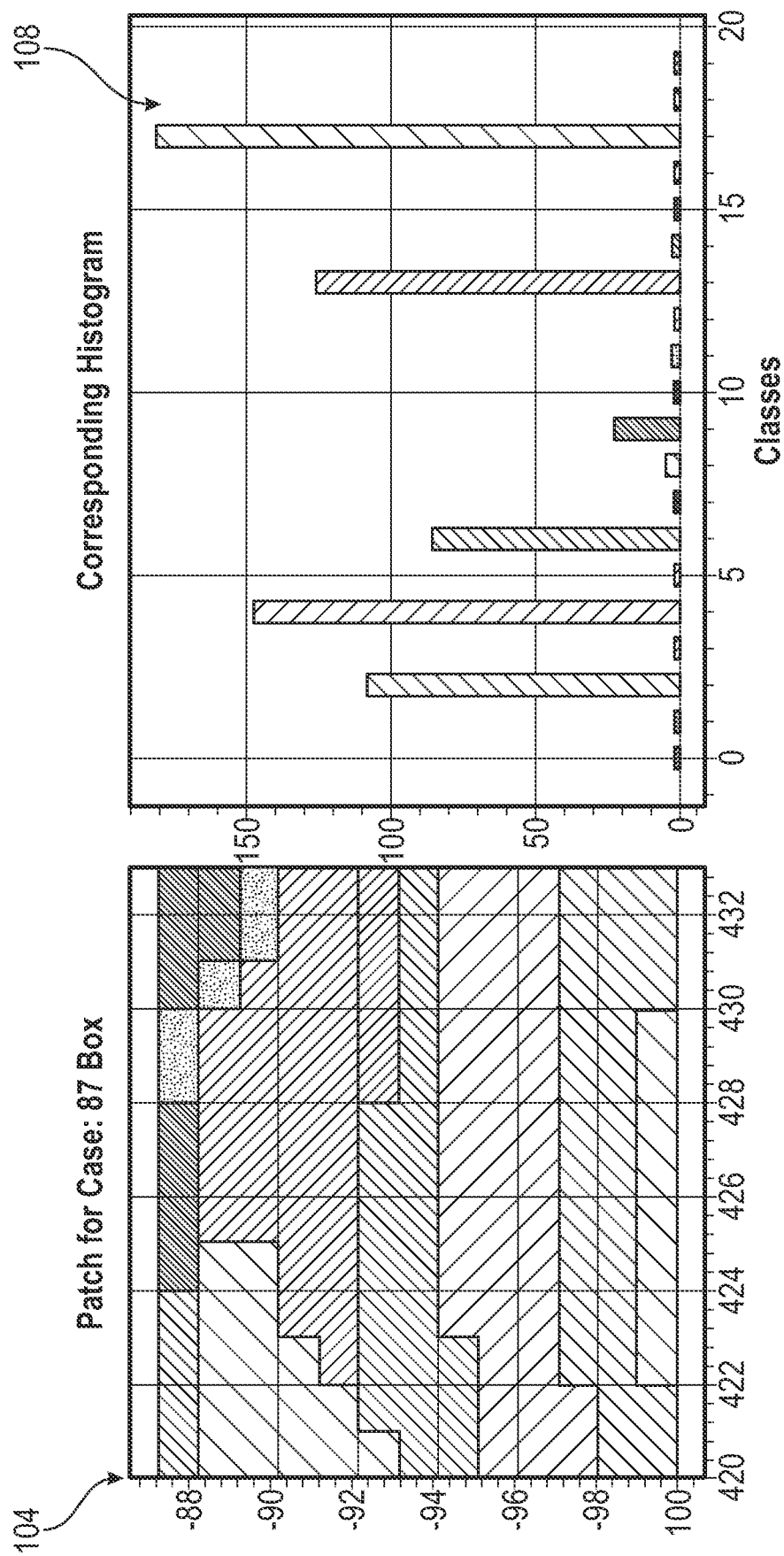
FIG. 9 illustrates a second example of a 2D patch and its corresponding 1D histogram generated in conjunction with the signature finder operation of FIG. 5, in accordance with an embodiment.

FIG. 8 illustrates an example of a 2D (2-dimensional) signature patch 102 illustrative of a seismic facies pattern when projected onto a respective unsupervised seismic facies volume (i.e., one of the signatures described above with respect to FIGS. 6 and 7). Likewise, FIG. 9 illustrates another example of a 2D signature patch 104 illustrative of a seismic facies pattern when projected onto a second respective unsupervised seismic facies volume (e.g., whereby the projection may include the seismic facies pattern overlaid or otherwise compared on a location by location basis with the second respective unsupervised seismic facies volume). As illustrated in FIG. 8 and FIG. 9, the signature patch 102 shows a different seismic facies pattern than the signature patch 104, which corresponds to the signature being projected on the different respective unsupervised seismic facies volumes. Furthermore, in some embodiments, instead of and/or in addition to generating 2D signature patches, 3D signature patches can also be defined.

Returning to FIG. 5, in step 90 the 2D signatures for are then reduced to a 1D (1-dimensional) histogram. FIG. 8 illustrates an example of a 1D histogram 106 that shows the population of each of the seismic facies (clusters) present in the respective 2D signature patch 102. Similarly, FIG. 9 illustrates an example of a 1D histogram 108 that shows the population of each of the seismic facies (clusters) present in the respective 2D signature patch 104. The 1D histograms are then used to evaluate matches with respect to the whole dataset (i.e., evaluated in the clustering volumes of step 86) in step 90. This process operates to determine where the 1D histograms correlate most and where they least correlate with the data generated in step 86. In some embodiments, the 1D histograms may also connote or otherwise represent a location in the 2D patch in which the each of the seismic facies (clusters) is present. It should be noted that the use of 1D histograms simplifies the spatial relation of the seismic facies/clusters in the patch so instead, in some embodiments, the whole 2D patch can also be cross-correlated (which results in better geological constraints) with the data generated in step 86. Furthermore, the 1D histograms are merely a representation, however, alternative groupings of the data may be undertaken.

In this manner, for each of the box signatures, a histogram will be created for each of the clustered volumes which will then be matched with all over the dataset of the clustered outputs. Thus, steps 88 and 90 of FIG. 5 operate to compare a ROI or signature input into the signature finder operation program and the image match operation searches for similar seismic facies patterns across the dataset generated in step 86. As discussed above, the user/interpreter identifies the ROIs (e.g., signature patches). These signatures are then correlated in all the locations of the selected survey area. The signature patches from each of dataset generated in step 86 are correlated with the data from which it was extracted (respective unsupervised seismic facies/clustered volume). Moreover, correlation can be based on a 1D histogram correlation, as described above. This process creates the correlation volumes for all the different unsupervised seismic facies volumes.

Figure 10:
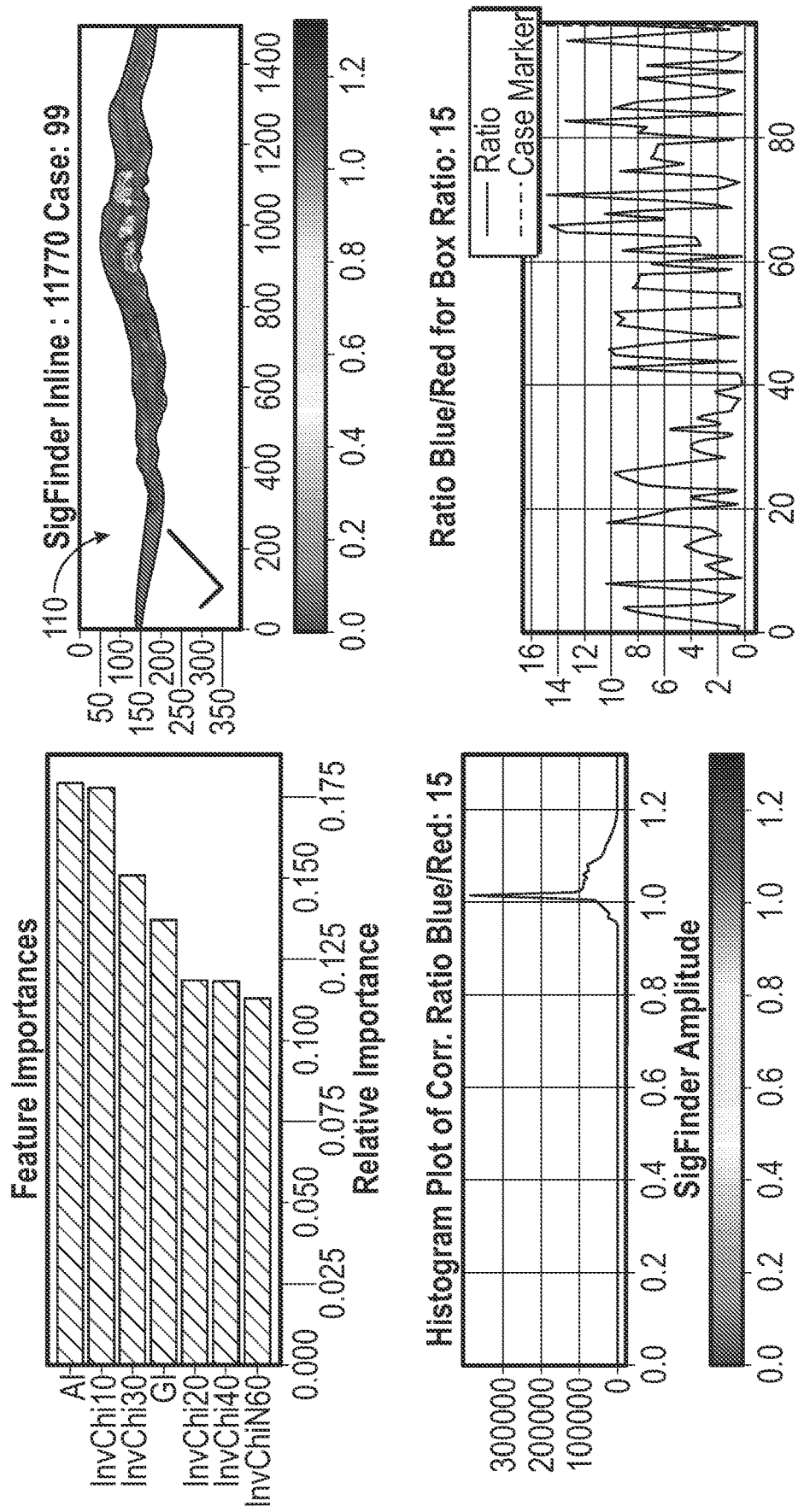
FIG. 10 illustrates an example of correlation data that is selected as an accepted signature in conjunction with the signature finder operation of FIG. 5, in accordance with an embodiment.
Figure 11:
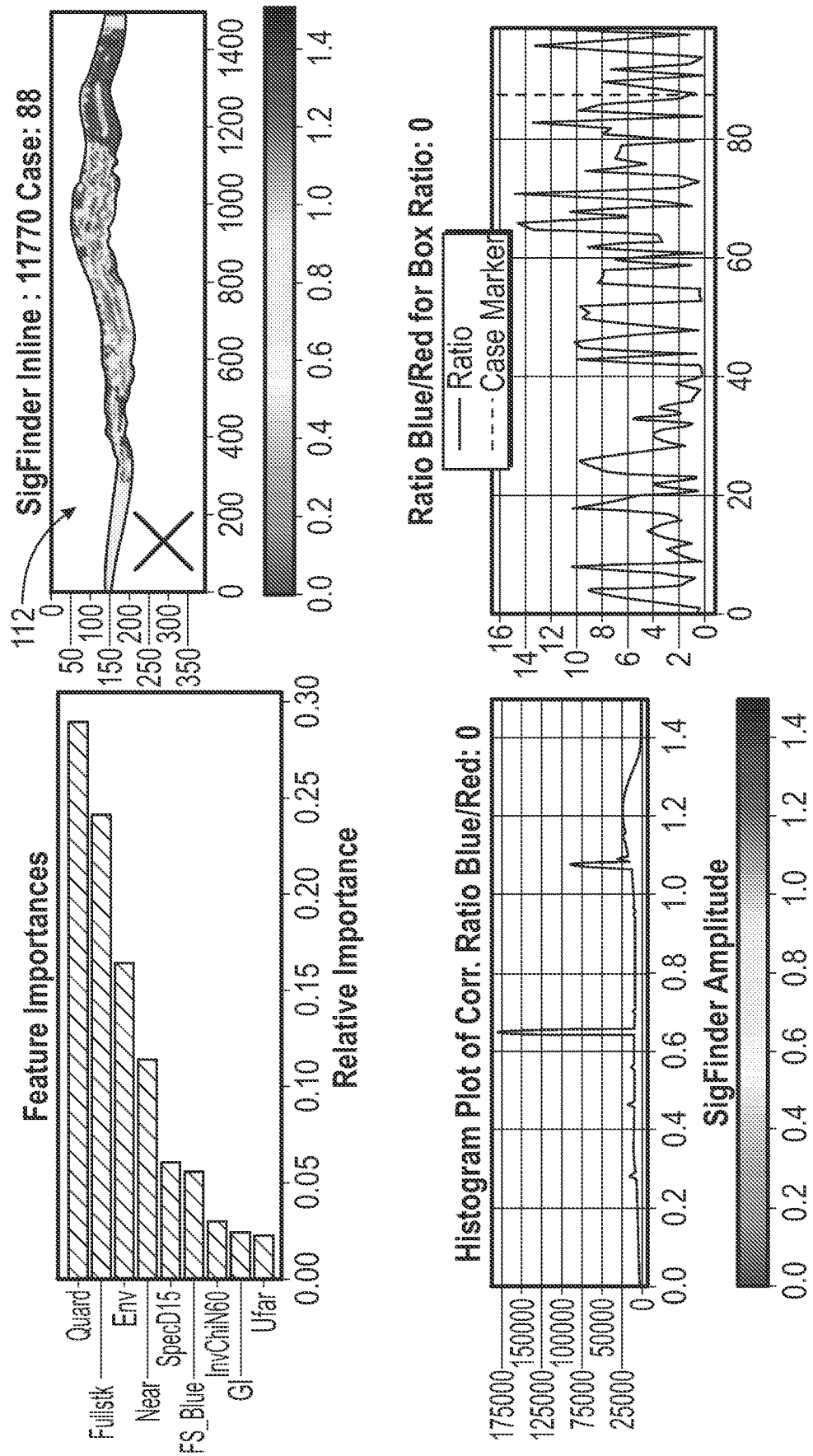
FIG. 11 illustrates an example of correlation data that is declined as a declines signature in conjunction with the signature finder operation of FIG. 5, in accordance with an embodiment.

In step 92, based on the type of signature patches, some of the correlation volumes are selected and some of the correlation volumes are eliminated. FIG. 10 illustrates an example of an accepted signature 110 while FIG. 11 illustrates an example of a declined signature 112. Whether the correlation volume is accepted or declined (i.e., eliminated)

in step 92 of FIG. 5 is based on, for example, a predetermined or otherwise pre-defined threshold value, which may be, for example, a cut off of the ratio between the un-correlated vs. correlated regions of the data. Moreover, in some embodiments, geological input is preferred to have more insight of the selection process. Additionally, in some embodiments, acceptance and declining of correlation data may be performed fully by the computing system 60, by a user, or a combination thereof (e.g., the computing system can disregard all correlation data that does not meet one or more threshold values and a user can choose from the remaining correlation data which will be finally accepted).

The selection process of step 92 results in selection of few list of the attribute combinations which are relevant for a signature. In most of the cases only a handful of attribute combination lists are selected. That is, based on the interpretation and the cutoff applied in step 92, unrealistic and/or undesirable cases are eliminated. Thus, step 92 reduces the seismic attribute combinations to few handful/relevant list of attributes and this process can be performed, for example using user interpretation and/or prior provided (predetermined) information.

In this manner, step 92 results in a list of accepted correlation volumes for a given signature. Similarly, step 92 can be repeated for other signatures to generate respective lists of correlation volumes. As previously noted, attribute selection is one of the major aspects of unsupervised cluster analysis. The techniques of the signature finder operation described herein operates to reduce the large set of seismic attributes to only the relevant ones and finding the relevant seismic attributes for a given signature.

Step 94 represents generation of outputs based on the reduced set of correlation volumes for a given signature. In one embodiment a weighted mean of the valid (e.g., selected) cases is performed in conjunction with step 94 to create the final most likely signature volume corresponding to one defined signature box (i.e., each ROI). This process can be repeated for each ROI (i.e., each defined signature box). This results in final most likely signature volumes being generates corresponding to each individual ROI Box or signature patch. Thus, in one or more embodiments, a weighted average of the "good" or reasonable cases can again, based on user interpretation and/or prior information, be applied to create a weighted mean final most likely signature volume. Furthermore, in some embodiments, a predetermined number of such individual most likely signature volumes can be combined to create one single output merge volume that highlights the likelihood of different pattern boxes as a portion of step 94.

Figure 12:
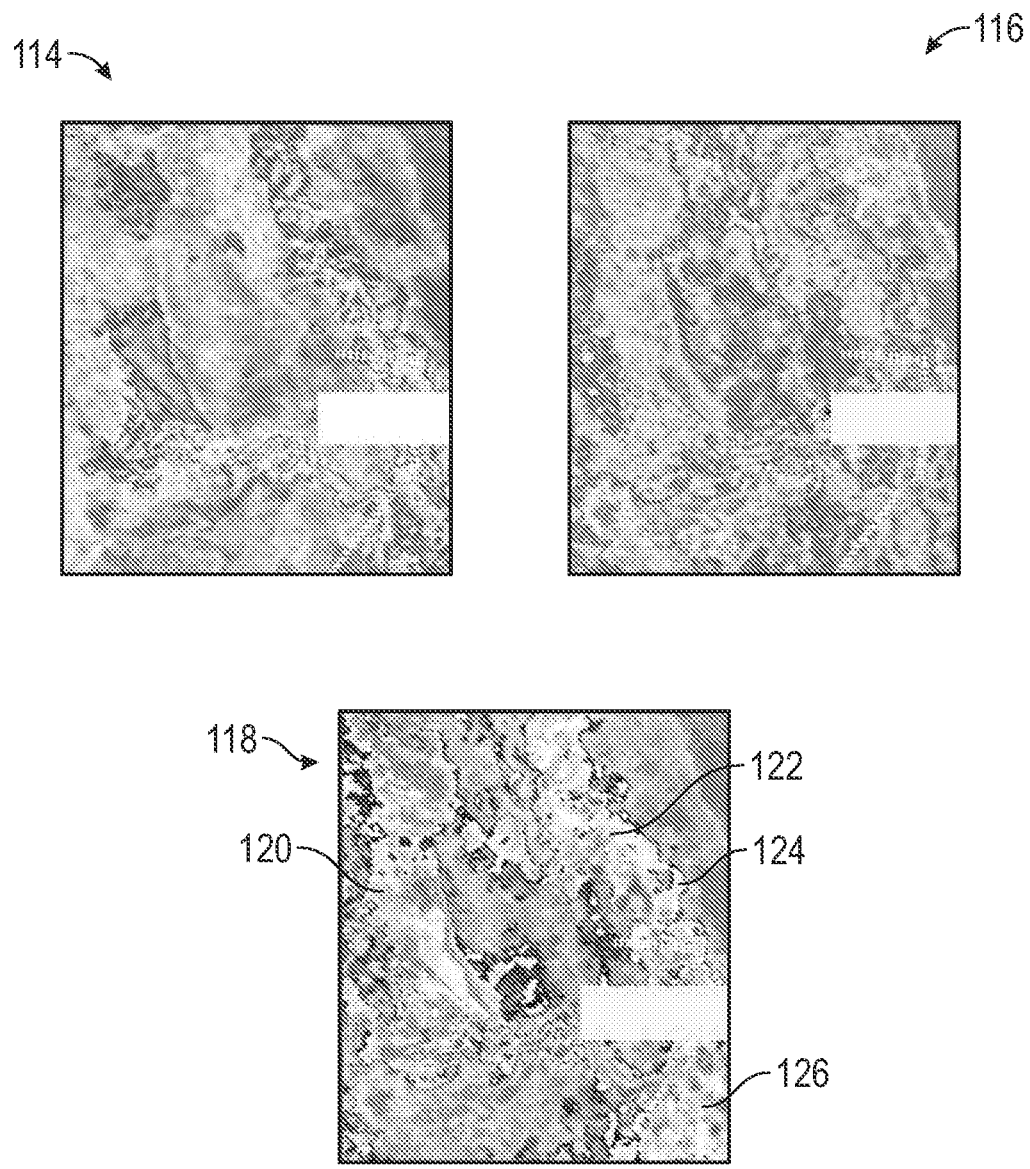
FIG. 12 illustrates final correlated volumes as well as a merged volume generated in conjunction with the signature finder operation of FIG. 5, in accordance with an embodiment.

That is, at the end of the signature finding process of step 92, one, two, or more of these mean most likely signature volumes are combined to create one single output volume that highlights the likelihood of different patterns in step 94. In one embodiment, the accepted correlation volumes for a given signature from step 92 are merged in step 94 using simple mean. In another embodiment, the accepted correlation volumes for a given signature from step 92 are combined by using weighted mean using the weights from the ratio of un-correlated sections vs. highly correlated sections. Two such final correlated volumes are illustrated in FIG. 12, which shows volume 114 as representative of an individual most likely signature volume from a first signature and shows volume 116 as representative of an individual most likely signature volume from a second signature. In some embodiments, in step 94, these values may be particularly generated and/or transmitted or presented to a user.

Likewise, in some embodiments, two or more final correlated volumes from the respective signatures can be merged to create one seismic volume which will highlight most likely regions for each of the signature. FIG. 12 illustrates volume 118 illustrative of the most likely signature volume as a merged volume of volume 114 and 116. As illustrated, regions 120 and 122 generally correspond to the most likely signature from volume 114 while regions 124 and 126 generally correspond to the most likely signature from volume 116 in the volume 118. In some embodiments, in step 94, volume 118 may be particularly generated and/or transmitted or presented to a user in conjunction with and/or separate from volumes 114 and 116.

Returning to step 92, in some embodiments, it is also possible to identify the most contributing seismic attributes for the accepted/relevant unsupervised seismic facies/cluster volumes. The dataset used for this process is the unsupervised seismic facies results as labels to the corresponding input set of seismic attributes. In one embodiment, SHAP (SHapley Additive exPlanations) is utilized to identify the most contributing seismic attributes for the accepted/relevant unsupervised seismic facies/cluster volumes (i.e., which features are the most useful and which features are less useful). The goal of SHAP is to explain the unsupervised facies results. Use of SHAP values to explain the results generated and output in step 94 can thus be achieved, by generating results in step 94 that illustrate which features or seismic attributes contributed more and which features or seismic attributes contribute less to the unsupervised facies results.

Figure 13:
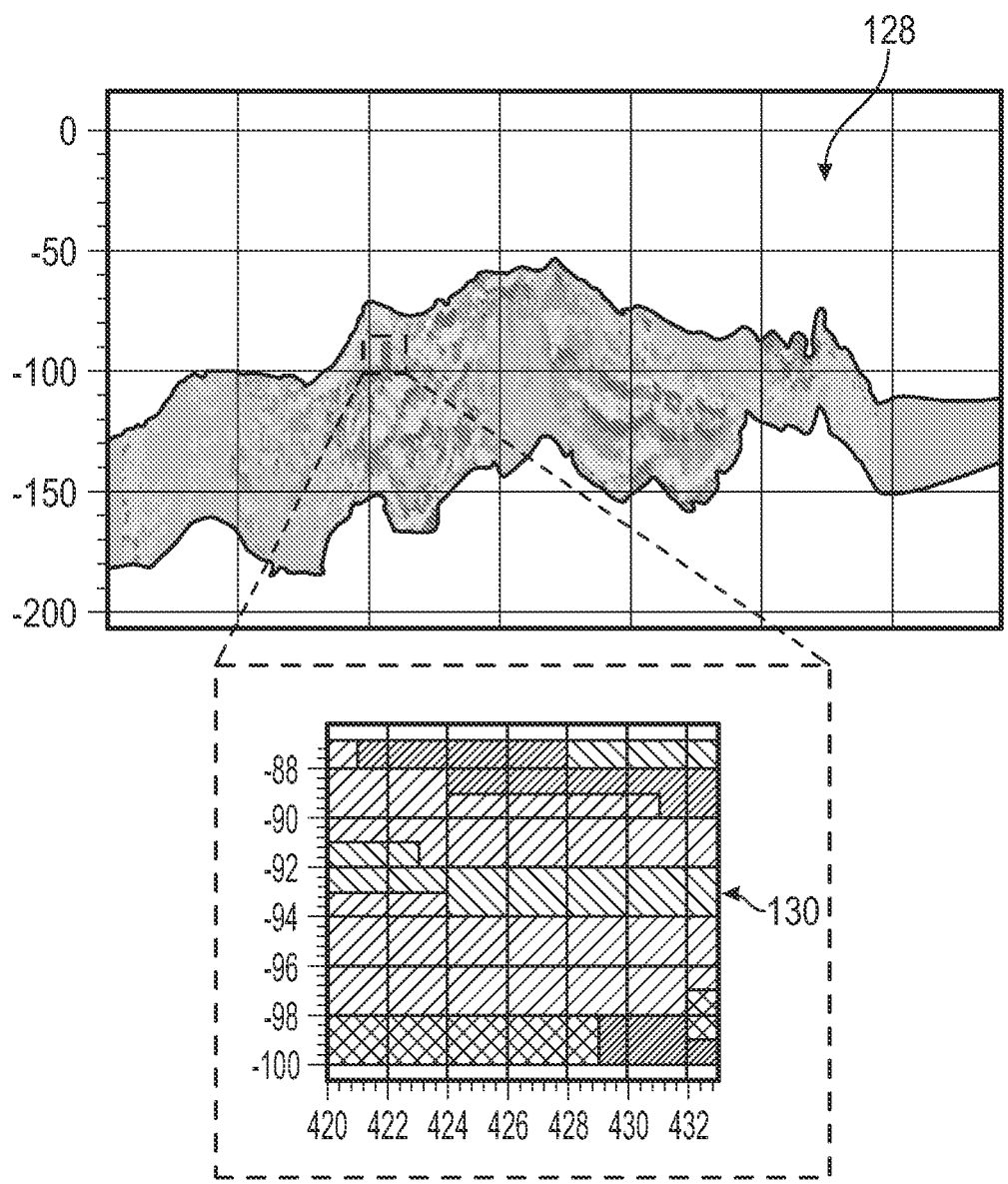
FIG. 13 illustrates a relevant volume as well as a focused signature region thereof generated in conjunction with the signature finder operation of FIG. 5, in accordance with an embodiment.
Figure 14:
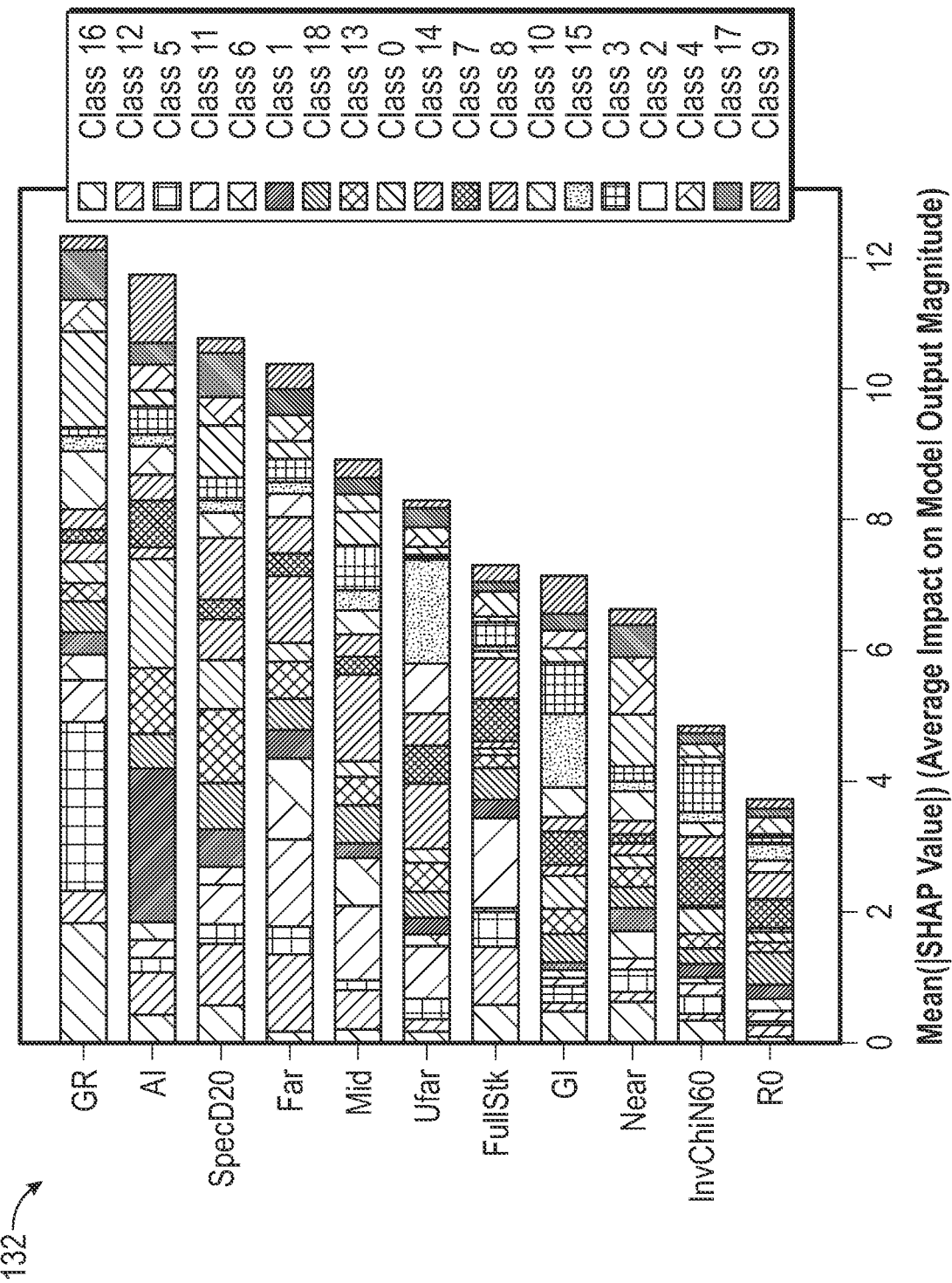
FIG. 14 illustrates a bar plot of seismic attribute importance for data generated in step 86 of FIG. 5 broken down into classes, in accordance with an embodiment.

FIG. 13 illustrates an example of a volume 128 representative of one of the determined relevant classification volumes generated in step 92 as well as a focused signature region 130 thereof. FIG. 14 illustrates a bar plot 132 of seismic attribute importance for the data generated in step 86 broken down into seismic facies classes. In this manner, the bar plot 132 can illustrate the mean SHAP Value for all the seismic attributes in a representative manner (e.g., color-coded by the contribution from each seismic facies or clusters). Sorting of the importance in the bar plot 132 can be performed in a manner whereby the most contributing seismic attributes will be at the top, as illustrated, or in other manners.

Figure 15:
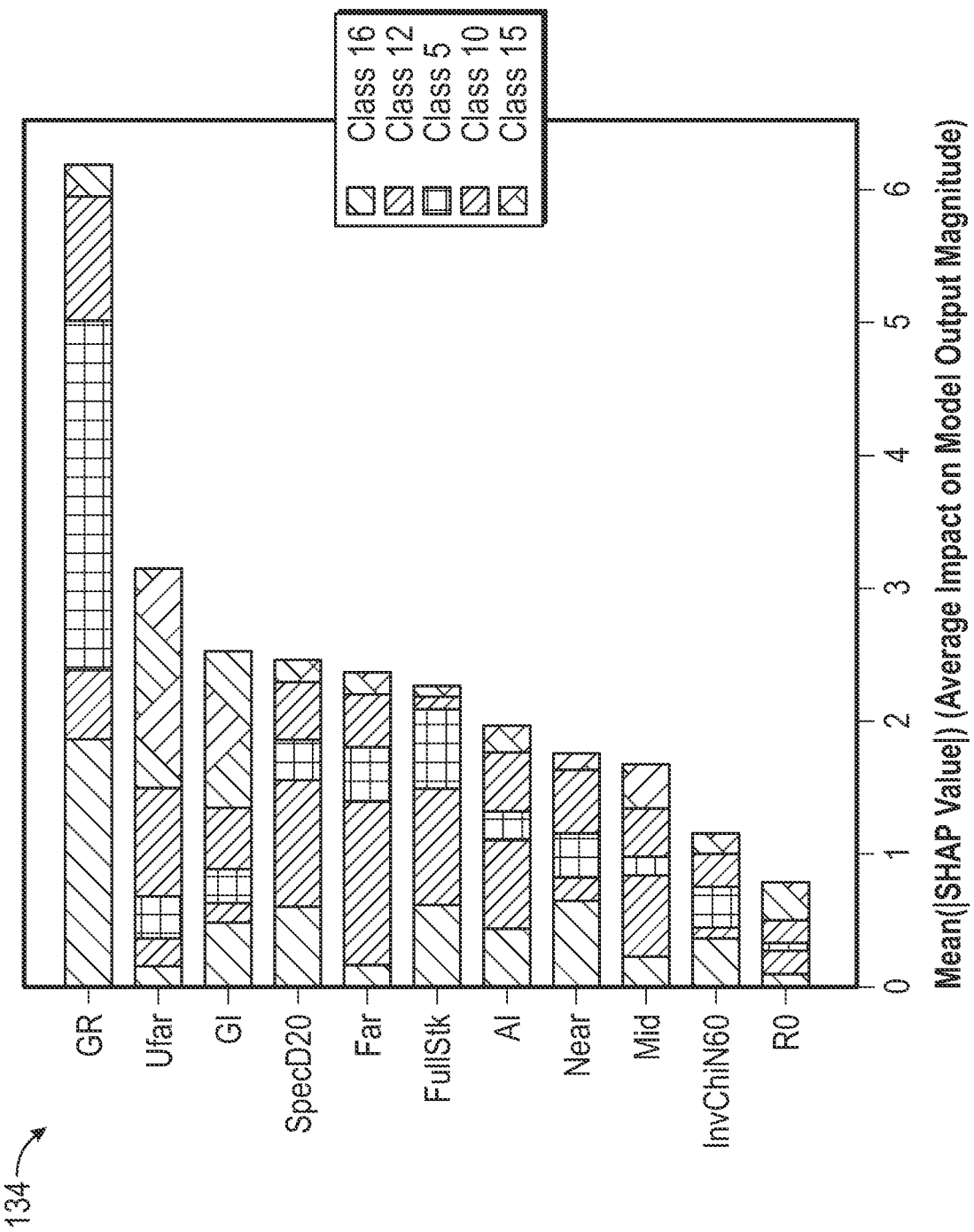
FIG. 15 illustrates bar plot illustrating mean Shapley Additive Explanations (SNAP) values for the seismic attributes in a representative manner coming from the focused signature region of FIG. 13, in accordance with an embodiment.

FIG. 15 illustrates bar plot 134 illustrating the mean SHAP value for all the seismic attributes in a representative manner (e.g., color-coded by the contribution from each seismic facies or clusters) coming from the Selected Region of Interest (Signature box), i.e., the focused signature region 130 of FIG. 14. In this manner, bar plot 134 illustrates attribute importance for focused signatures broken down into classes.

Figure 16:
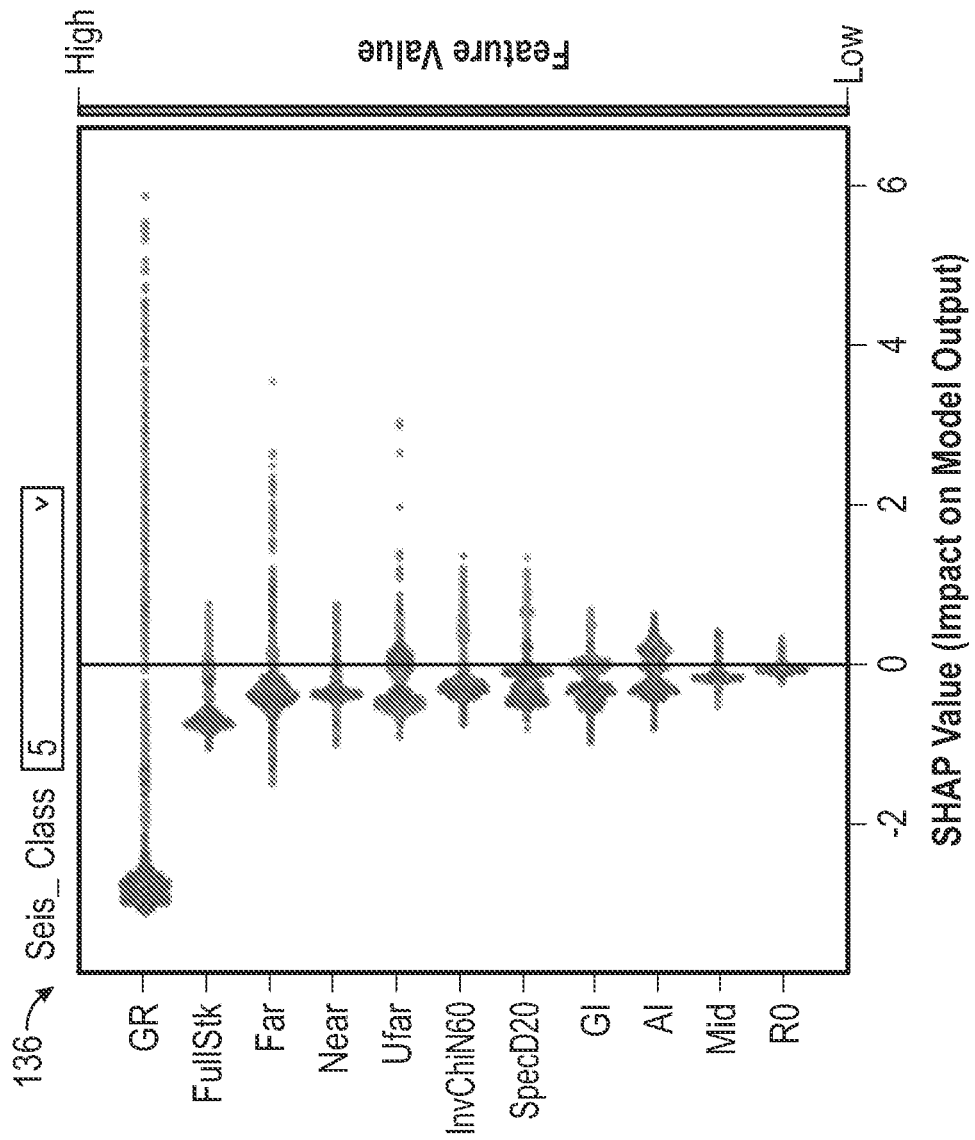
FIG. 16 illustrates a graph representing each of the seismic facies classes coming from the focused signature region of FIG. 13, in accordance with an embodiment.

FIG. 16 illustrates a graph representing how each seismic facies class can be further studied on how much each seismic attribute contributed to it in positive and negative manner. That is, FIG. 16 illustrates the attribute importance for a relevant seismic class from the focused signature region 130 of FIG. 14. Taken together, the examples represented in FIGS. 13-16 illustrate an example of the use of SHAP to identify the most contributing seismic attributes for the accepted/relevant unsupervised seismic facies/cluster volumes as well as the results that can be generated and/or transmitted or presented to a user in step 94. The use of SHAP also helps to create an insightful result where the users can back-track the validity of the results and makes the whole signature finder workflow much more transparent and explainable workflow rather than being a black-box.

Figure 17:
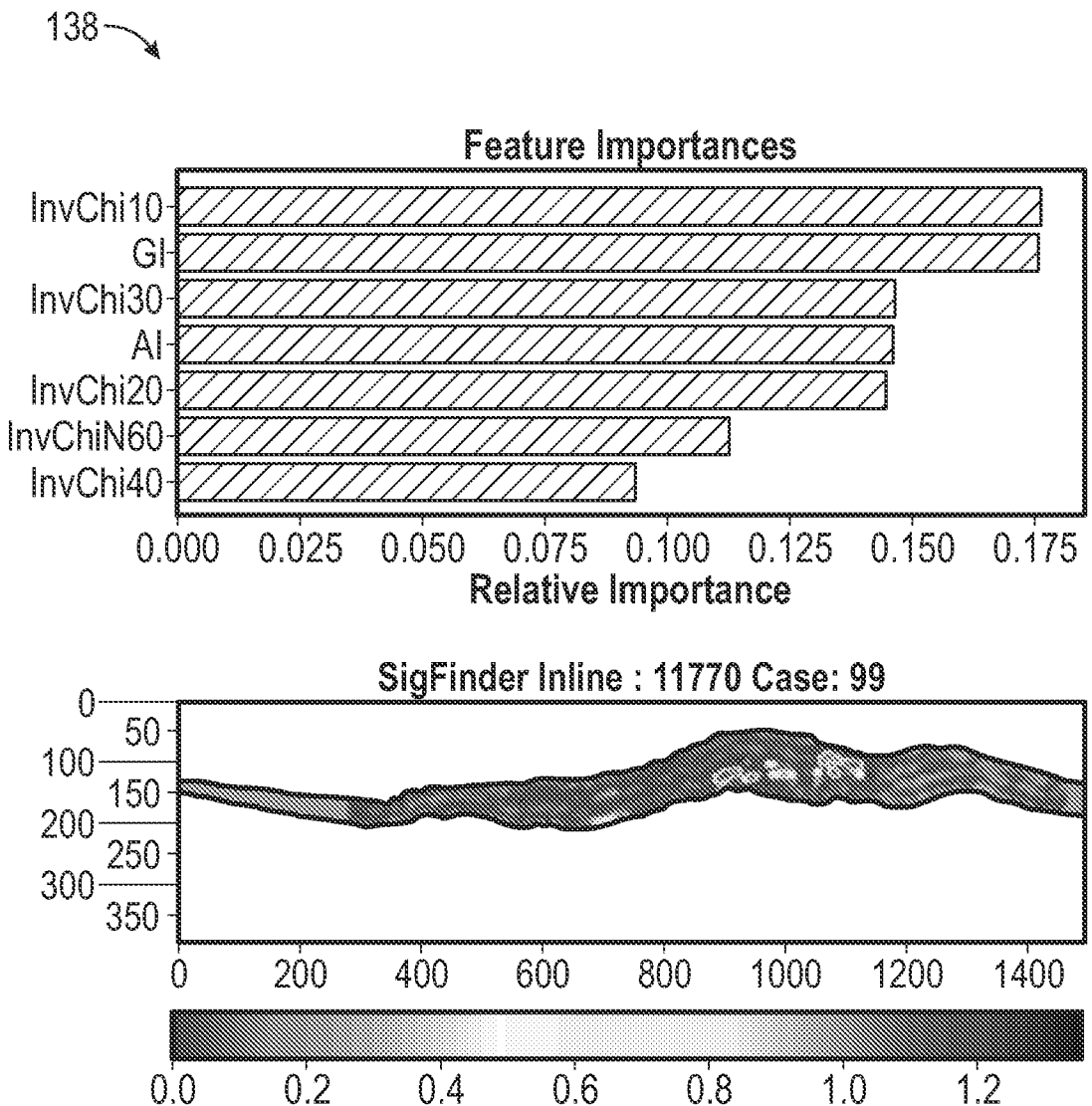
FIG. 17 illustrates an example of seismic attribute/feature importance using permutation techniques utilized in conjunction with the signature finder operation of FIG. 5, in accordance with an embodiment.

In other embodiments, increases in speed may be desired. Accordingly, the signature finder operation discussed above can me modified, for example, provide approximate insight to the attributes relevant for the unsupervised seismic facies/ cluster volume. For example, permutation feature importance can be generated from running a gradient booster classification on the unsupervised seismic facies results in step 86. An example of seismic attribute/feature importance using permutation techniques is illustrated in chart 138 of FIG. 17. In another embodiment, utilization of random forest feature importance can be applied, for example, in step 92.

Figure 18:
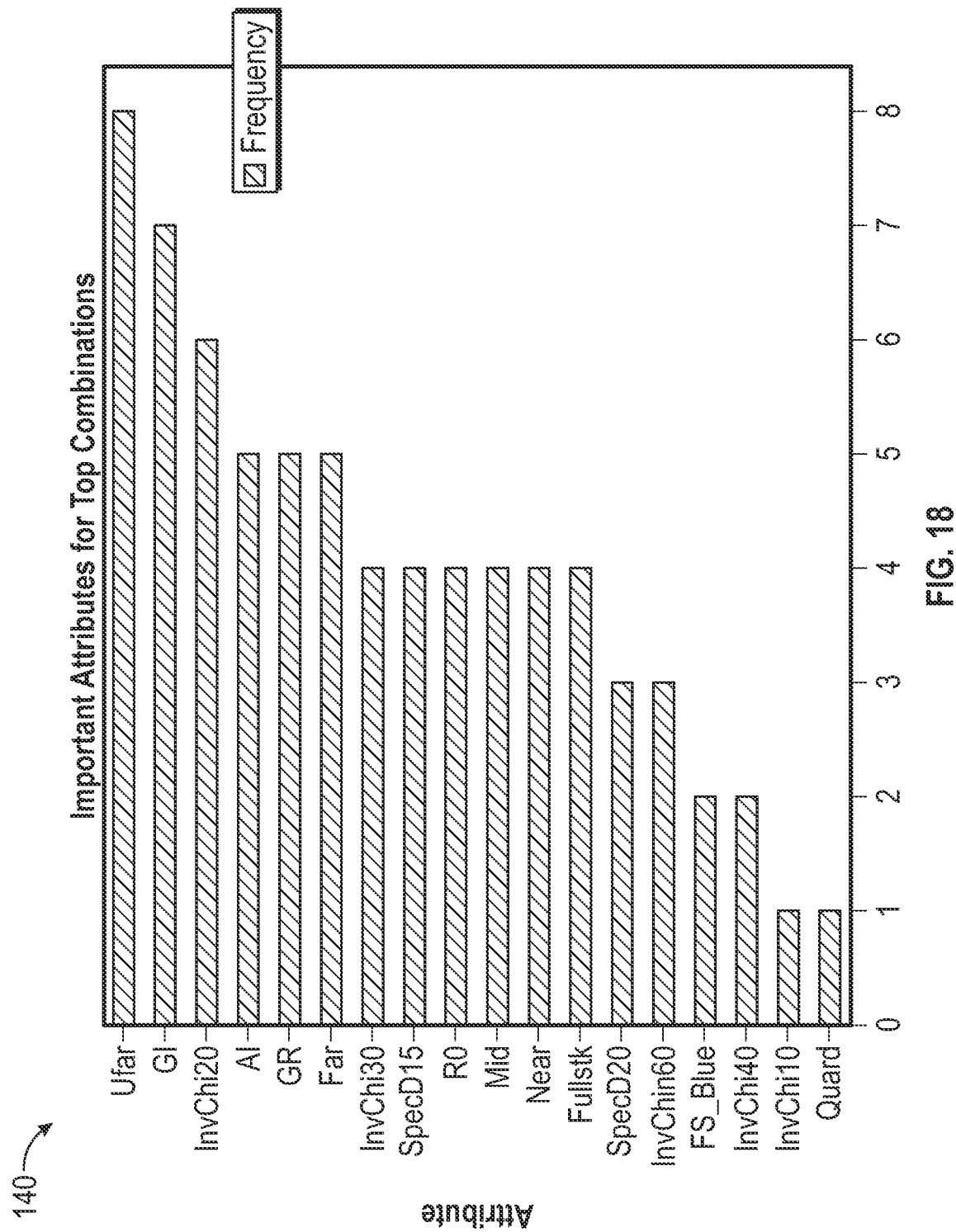
FIG. 18 illustrates a plot illustrating a ranking of seismic attributes by contribution to a given signature generated in conjunction with the signature finder operation of FIG. 5, in accordance with an embodiment.

Additionally, in some embodiments, a final product of the signature finder operation in step 94 may also provide a list of seismic attributes that have the largest contribution to a given signature. FIG. 18 illustrates a plot 140 in which the seismic attributes that have the largest contribution to a given signature are sorted and presented with the most relevant attribute at the top. This illustrates an example of an output from step 94 that can be generated and/or transmitted or presented to a user. The outputs generated in step 94 can be useful in helping a geoscientist to go back to the seismic attribute volumes, which has physical/rock properties meaning, to find the cause of a given signature or interpret the final signature volume.

The signature finder operation represents a technique based on machine learning and pattern finding which searches for a given signature in large seismic survey areas simultaneously in a large seismic attribute space, which is otherwise that is not possible by manual analysis/interpretation. The above described operation helps is increasing accuracy in finding a pattern all over the dataset, since in operation is can simultaneously explore approximately 10, 20, 30 or more input seismic attribute volumes (or mathematically—dimensional space). With manual interpretation, there is a possibility to overlook patterns/prospects in a huge dataset and there is typically only a handful (e.g., approximately 3) simultaneously investigated seismic attributes or dimensional space. The signature finder operation is not similarly constrained in terms of data dimensionality space or overlooking areas of similar patterns, which might be hydrocarbon prospects. That is, through use of a greater number of input seismic attribute volumes, results can be generated that otherwise are not possible to generate.

The signature finder operation additionally minimize the initial interpretation bias by automatically producing the best set of seismic attributes for a given signature (i.e., from step 92 of FIG. 5). A user is thus freed to focus more on post analysis of the volumes out from the signature finder operation. Also, the signature finder operation generates as results (e.g., in step 94 of FIG. 5) the contributions or importance of each of the seismic attributes in generating the results, as an option to provide to a user, which makes the whole process much more explainable.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
   automatically selecting a first plurality of seismic attributes corresponding to seismic data as first selected seismic attributes;
   combining the first selected seismic attributes into a first realization of attributes;
   automatically selecting a second plurality of seismic attributes corresponding to the seismic data as second selected seismic attributes;
   combining the second selected seismic attributes into a second realization of attributes;
   performing a first cluster analysis on the first realization of attributes to generate a first clustered volume;
   performing a second cluster analysis on the second realization of attributes to generate a second clustered volume;
   selecting a region of interest (ROI) in the seismic data;
   projecting the ROI onto the first clustered volume to generate a first signature;
   projecting the ROI onto the second clustered volume to generate a second signature;
   determining a first level of correlation between the ROI and the first signature;
   determining a second level of correlation between the ROI and the second signature;
   determining whether the first level of correlation between the ROI and the first signature exceeds a predetermined threshold and outputting a first correlation volume corresponding to the first signature when the first level of correlation between the ROI and the first signature exceeds the predetermined threshold; and
   determining whether the second level of correlation between the ROI and the second signature exceeds the predetermined threshold and outputting a second correlation volume corresponding to the second signature when the second level of correlation between the ROI and the second signature exceeds the predetermined threshold.

2. The method of claim 1, comprising generating a most likely signature volume based on the first correlation volume and the second correlation volume when both of the first correlation volume and the second correlation volume are outputted.

3. The method of claim 2, wherein generating the most likely signature volume comprises merging the first correlation volume with the second correlation volume to generate a merged volume as the most likely signature volume.

4. The method of claim 3, comprising outputting an indication of which seismic attributes of the first plurality of seismic attributes have a largest contribution to the most likely signature volume.

5. The method of claim 2, comprising outputting the most likely signature volume for use in interpretation of the seismic data.

6. The method of claim 1, wherein automatically selecting the first plurality of seismic attributes comprises randomly selecting the first plurality of seismic attributes.

7. The method of claim 1, comprising categorizing the first plurality of seismic attributes into a predetermined number of groups.

8. The method of claim 7, wherein automatically selecting the first plurality of seismic attributes comprises randomly selecting at least one seismic attribute from each group of the predetermined number of groups.

9. The method of claim 1, wherein performing the first cluster analysis on the first realization of attributes comprises utilizing an unsupervised cluster analysis as the first cluster analysis, wherein the unsupervised cluster analysis is a Gaussian Mixture Model (GMM) Classification or a Self-organizing Maps (SoM).

10. The method of claim 1, wherein determining the first level of correlation between the ROI and the first signature comprises determining a population of various seismic facies present in the first signature.

11. The method of claim 1, further comprising:
automatically selecting a third plurality of seismic attributes corresponding to seismic data as third selected seismic attributes;
combining the third selected seismic attributes into a third realization of attributes;
performing a third cluster analysis on the third realization of attributes to generate a third clustered volume;
projecting the ROI onto the third clustered volume to generate a third signature;
determining a third level of correlation between the ROI and the third signature; and
discarding a third correlation volume corresponding to the third signature when the third level of correlation between the ROI and the third signature is less than the predetermined threshold.

12. A tangible and non-transitory machine readable medium, comprising instructions to cause a processor to:
automatically select a first plurality of seismic attributes corresponding to seismic data as first selected seismic attributes;
combine the first selected seismic attributes into a first realization of attributes;
automatically select a second plurality of seismic attributes corresponding to the seismic data as second selected seismic attributes;
combine the second selected seismic attributes into a second realization of attributes;
perform a first cluster analysis on the first realization of attributes to generate a first clustered volume;
perform a second cluster analysis on the second realization of attributes to generate a second clustered volume;
select a region of interest (ROI) in the seismic data;
project the ROI onto the first clustered volume to generate a first signature;
project the ROI onto the second clustered volume to generate a second signature;
determine a first level of correlation between the ROI and the first signature;
determine a second level of correlation between the ROI and the second signature;
determine whether the first level of correlation between the ROI and the first signature exceeds a predetermined threshold and generate a first output as a first correlation volume corresponding to the first signature when the first level of correlation between the ROI and the first signature exceeds the predetermined threshold; and
determine whether the second level of correlation between the ROI and the second signature exceeds the predetermined threshold and generate a second output as a second correlation volume corresponding to the second signature when the second level of correlation between the ROI and the second signature exceeds the predetermined threshold.

13. The tangible and non-transitory machine readable medium of claim 12, comprising instructions to cause the processor to generate a most likely signature volume based on the first correlation volume and the second correlation volume when both the first output and the second output are generated.

14. The tangible and non-transitory machine readable medium of claim 13, comprising instructions to cause the processor to generate the most likely signature volume by merging the first correlation volume with the second correlation volume to generate a merged volume as the most likely signature volume.

15. The tangible and non-transitory machine readable medium of claim 14, comprising instructions to cause the processor to generate an indication of which seismic attributes of the first plurality of seismic attributes have a largest contribution to the most likely signature volume.

16. The tangible and non-transitory machine readable medium of claim 13, comprising instructions to cause the processor to initiate transmission of the most likely signature volume for use in interpretation of the seismic data.

17. The tangible and non-transitory machine readable medium of claim 12, comprising instructions to cause the processor to automatically select the first plurality of seismic attributes by randomly selecting the first plurality of seismic attributes.

18. The tangible and non-transitory machine readable medium of claim 12, comprising instructions to cause the processor to categorize the first plurality of seismic attributes into a predetermined number of groups.

19. The tangible and non-transitory machine readable medium of claim 18, comprising instructions to cause the processor to automatically select the first plurality of seismic attributes by randomly selecting at least one seismic attribute from each group of the predetermined number of groups.

20. The tangible and non-transitory machine readable medium of claim 12, comprising instructions to cause the processor to perform the first cluster analysis on the first realization of attributes utilizing an unsupervised cluster analysis as the first cluster analysis, wherein the unsupervised cluster analysis is a Gaussian Mixture Model (GMM) Classification or a Self-organizing Maps (SoM).

21. The tangible and non-transitory machine readable medium of claim 12, comprising instructions to cause the processor to determine the first level of correlation between the ROI and the first signature by determining a population of various seismic facies present in the first signature.

* * * * *